United States Patent

Gutman et al.

[15] 3,688,822

[45] Sept. 5, 1972

[54] TOPPING ATTACHMENT FOR TREE HARVESTERS

[72] Inventors: Nathan Gutman, Washington; Dorrance Oldenburg, Peoria, both of Ill.

[73] Assignee: Caterpillar Tractor Co., Peoria, Ill.

[22] Filed: May 26, 1971

[21] Appl. No.: 147,012

[52] U.S. Cl. .................................. 144/3 D, 144/2 Z
[51] Int. Cl. .............., ................................. A01g 23/02
[58] Field of Search ................ 144/2 Z, 3 D, 309 AC

[56] References Cited

UNITED STATES PATENTS 3,620,272  11/1971  Eriksson et al. ............ 144/3 D

*Primary Examiner*—Gerald A. Dost
*Attorney*—Fryer, Tjensvold, Feix, Phillips & Lempio

[57] ABSTRACT

Two embodiments of a topping mechanism for a tree harvester including a frame movably mounted on a vehicle, drive means arranged on the frame for propelling a tree along a feed path extending through the delimber and a grapple arm movable toward and away from the frame for urging the tree into engagement with the drive means, the topping mechanism comprising two assemblies arranged respectively on the frame and the grapple arm, one of the assemblies including a pivotable blade capable of extension across the feed path and an actuator mechanism for controlling movement of the blade, the other assembly including a stop arranged for engagement with the actuator as the grapple arm approaches within a preselected distance from the frame.

5 Claims, 9 Drawing Figures

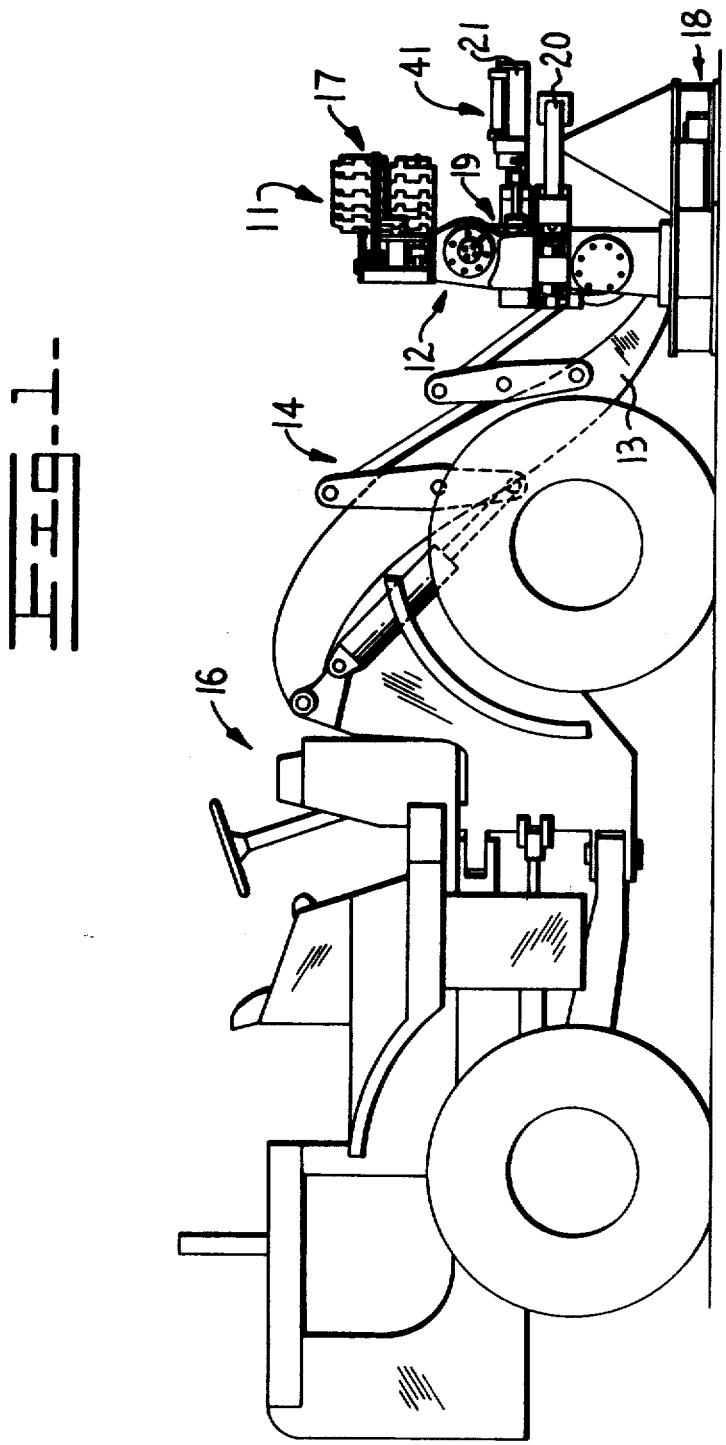

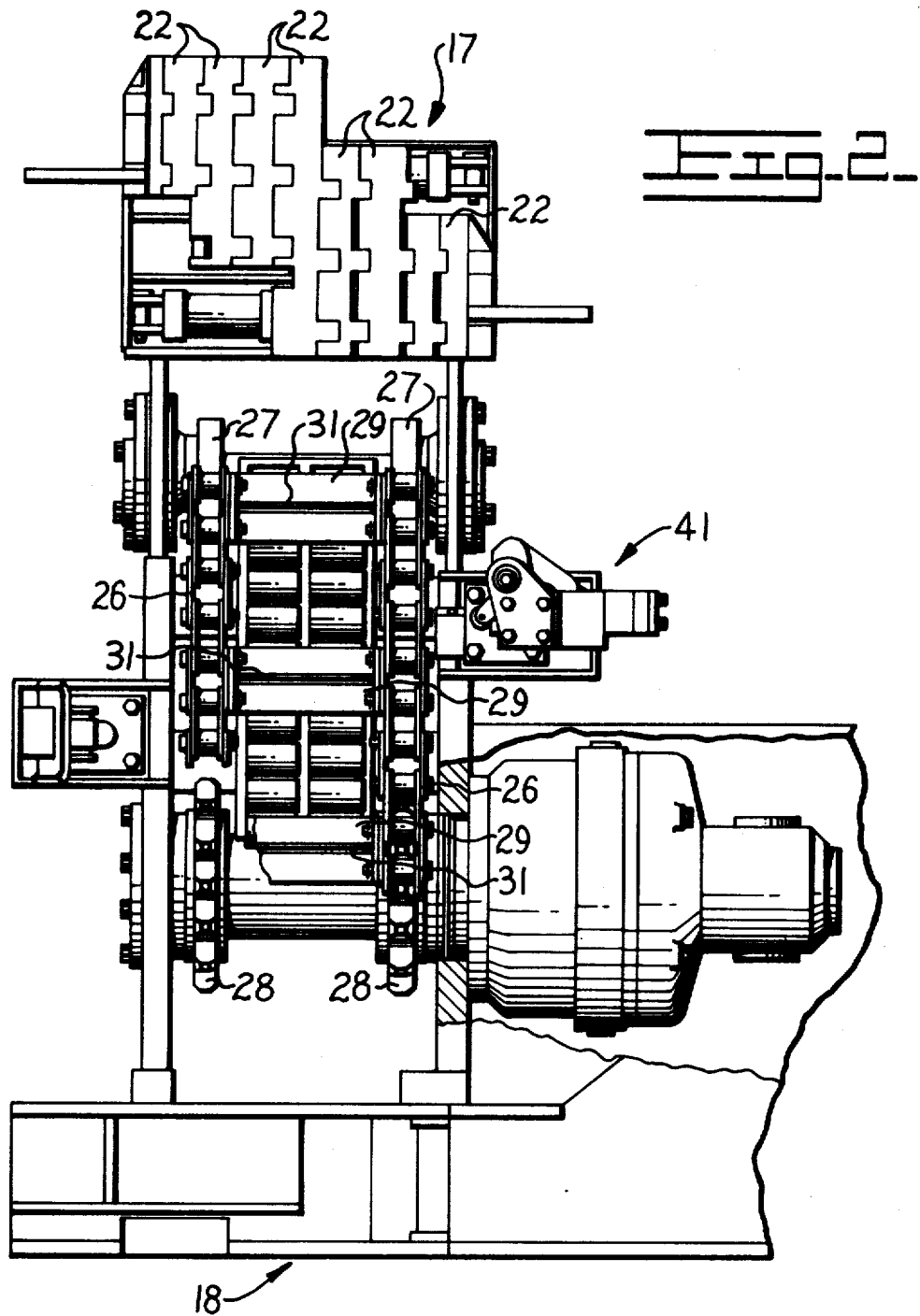

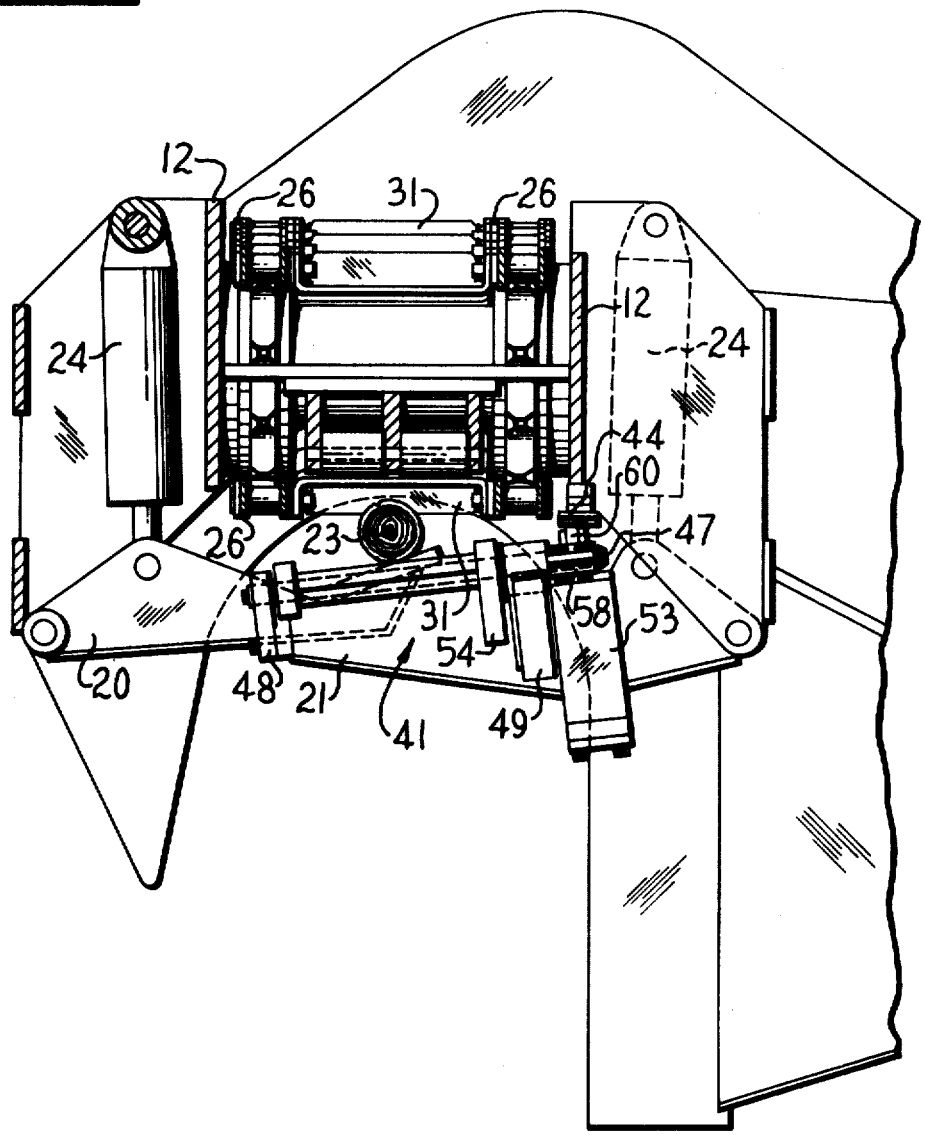

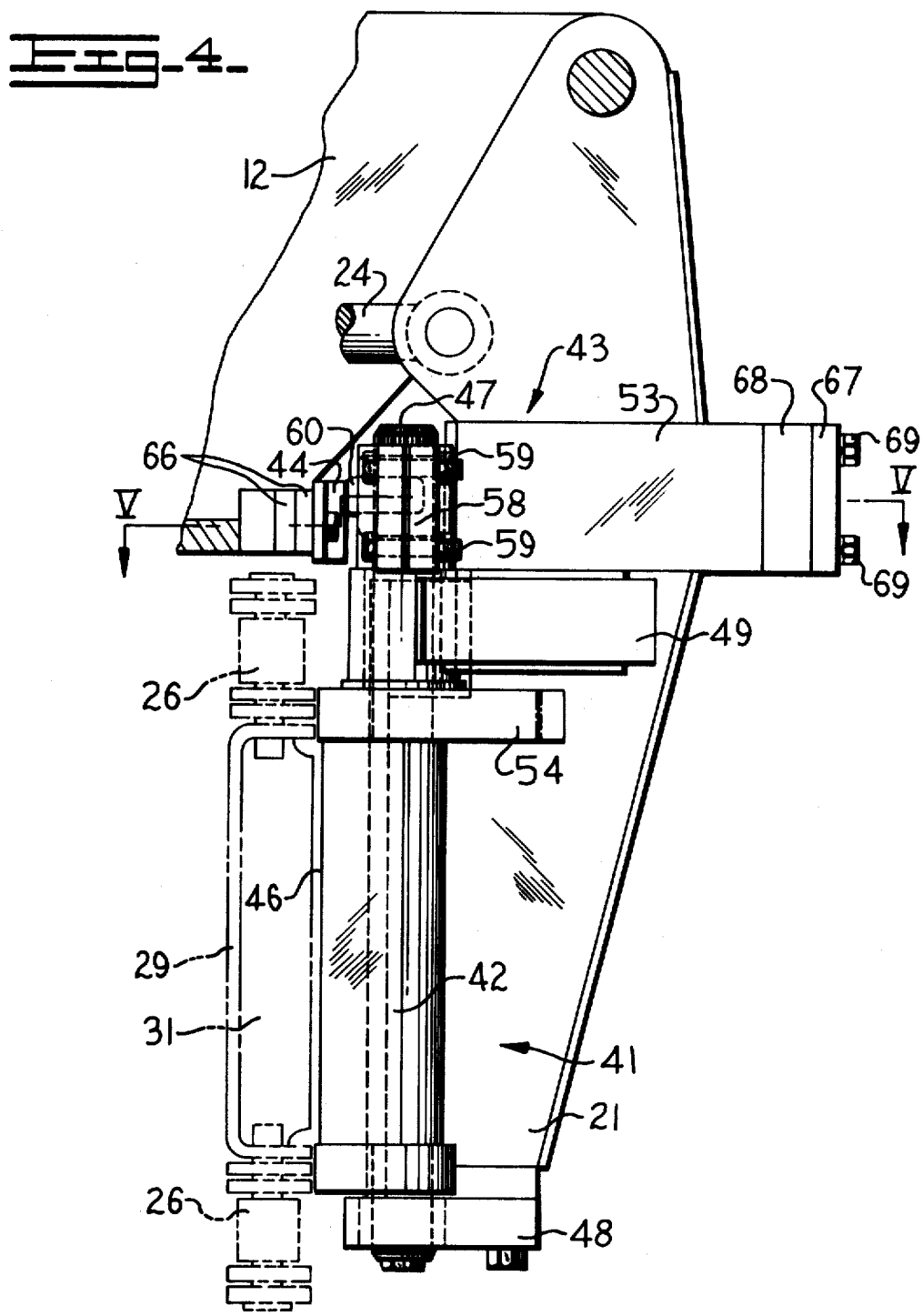

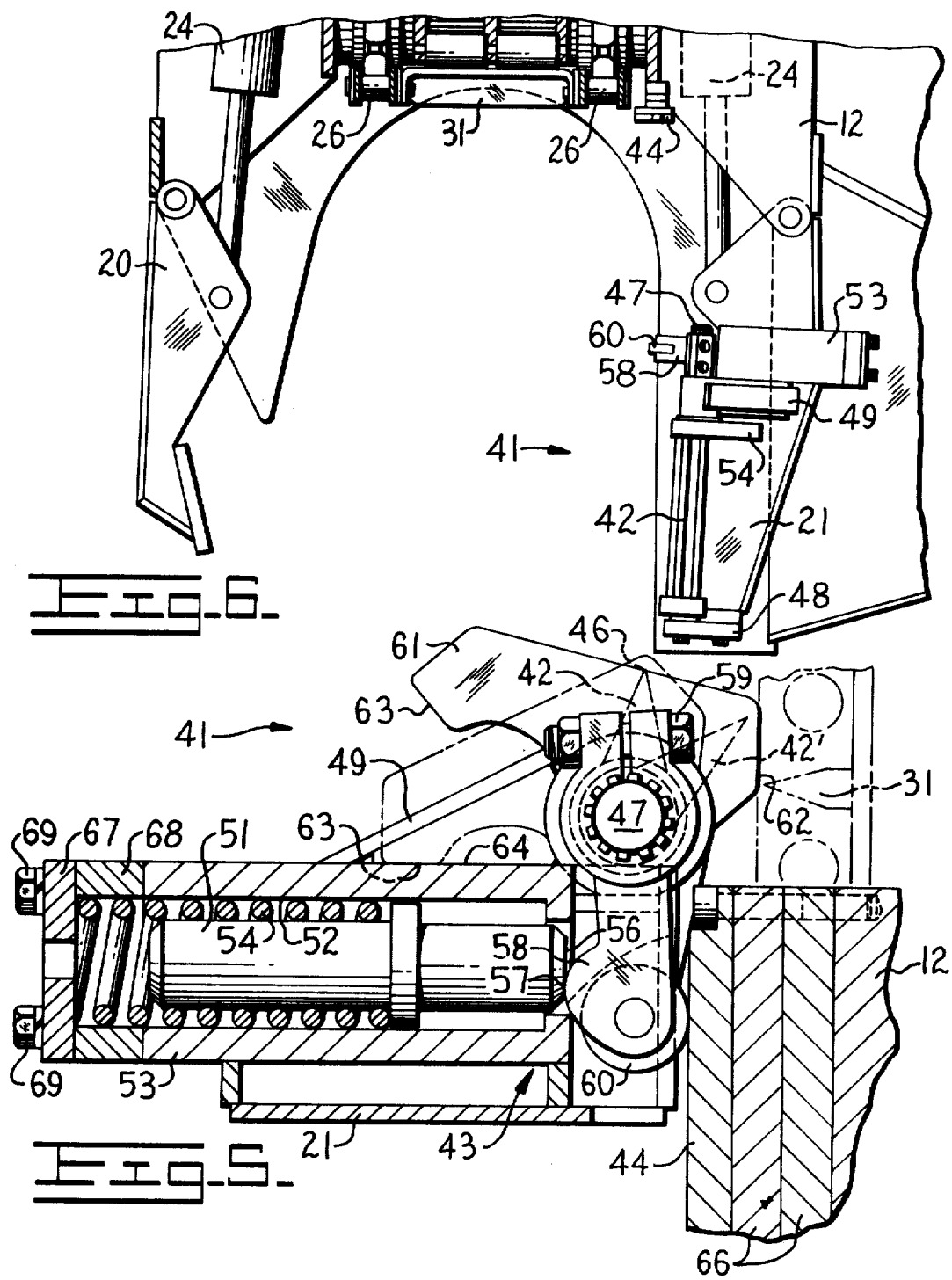

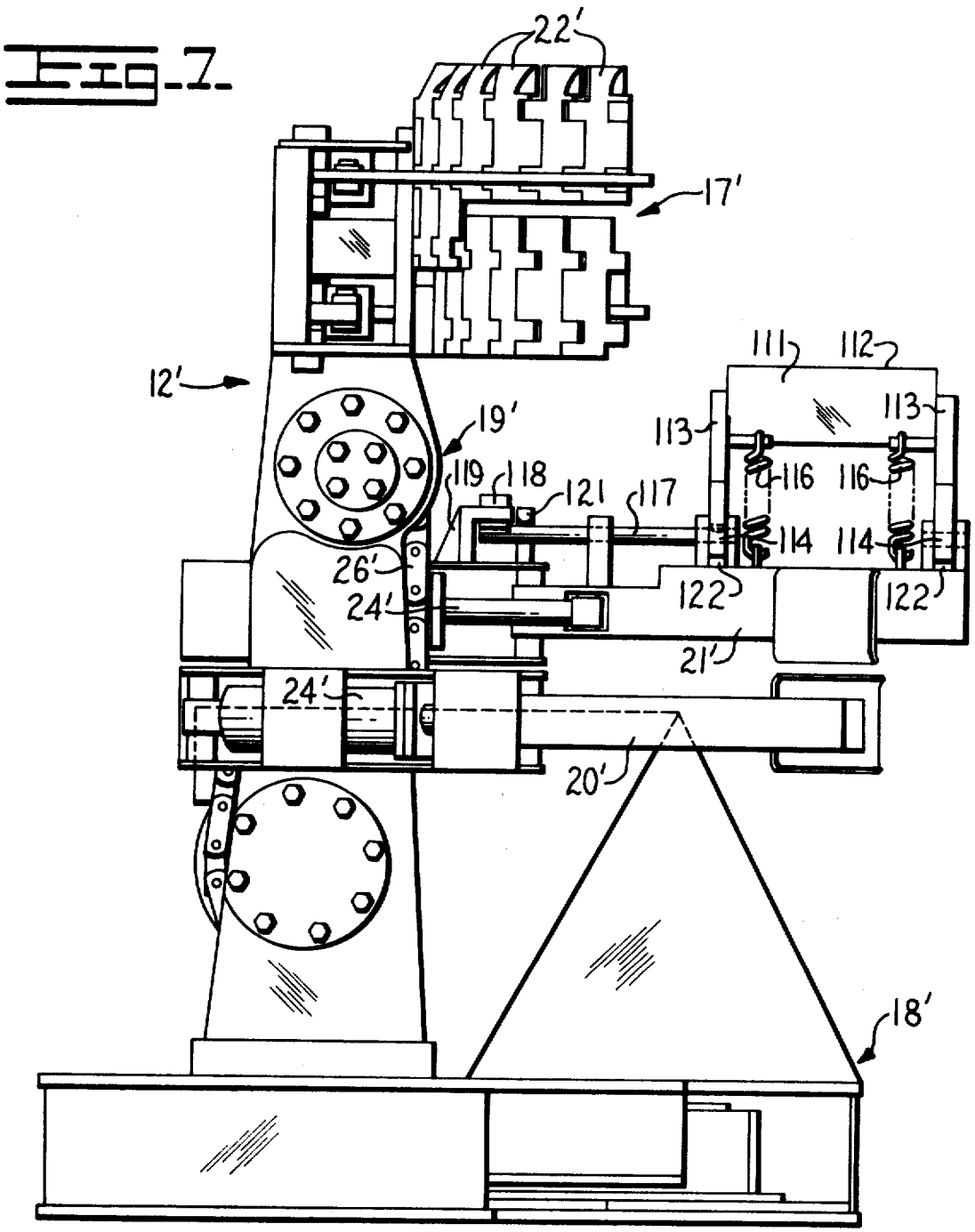

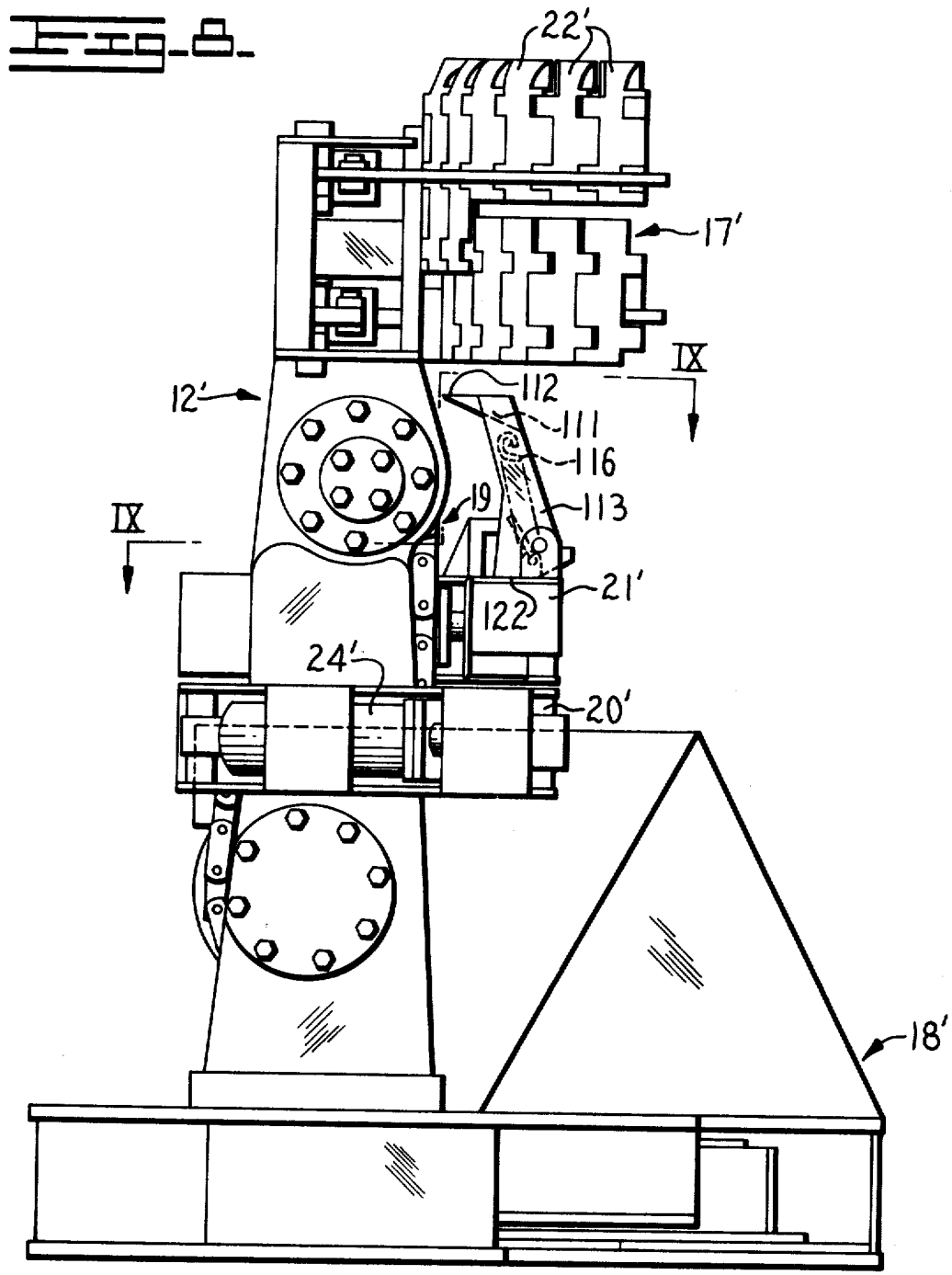

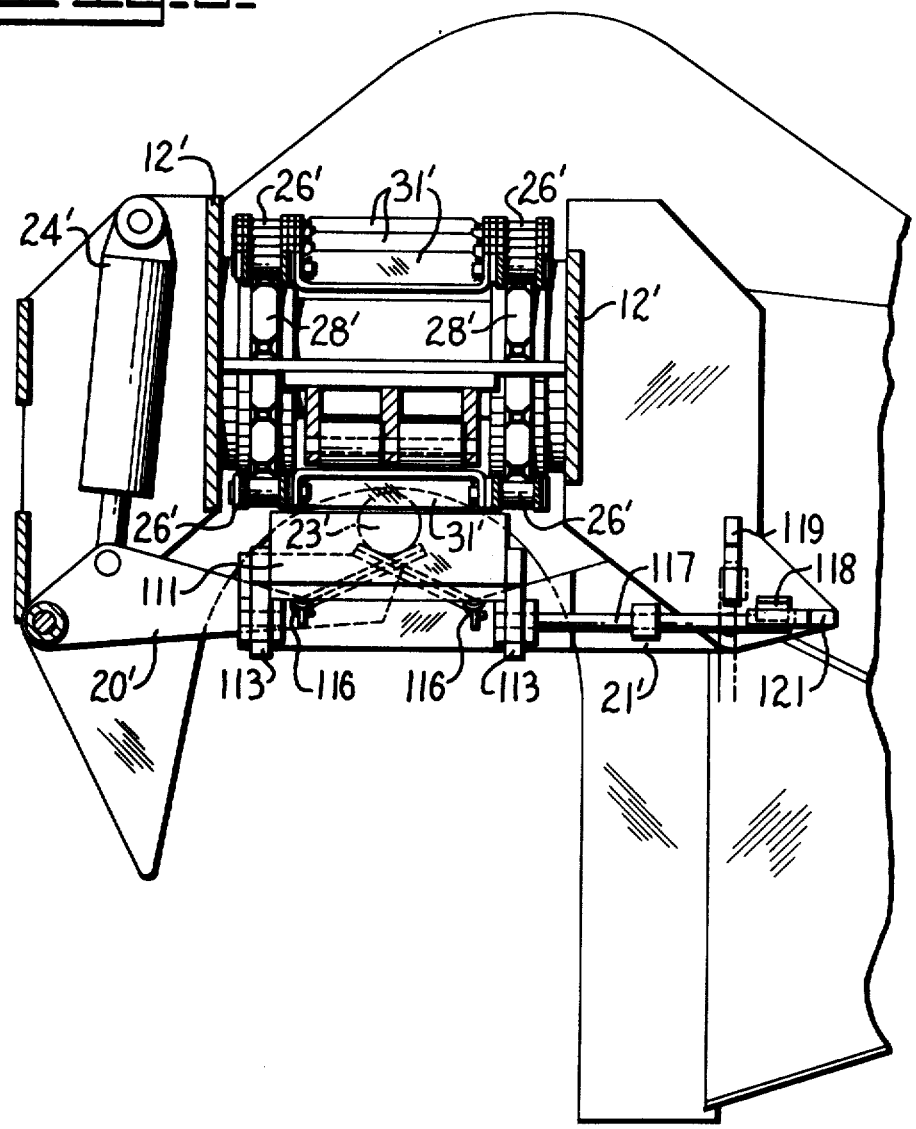

TOPPING ATTACHMENT FOR TREE HARVESTERS

The present invention relates to a topping attachment for tree harvesters of the type including a delimber and drive means for propelling a tree through or past the delimber. The tree harvester may also include a shear mechanism for severing standing trees and/or for cutting or bucking the tree into sections of predetermined length.

More particularly, the present invention relates to a topping mechanism which functions automatically or semi-automatically to shear the top of a tree at a predetermined diameter. In this manner, an unusable top portion of the tree may be automatically removed by the topping mechanism without requiring the operator's attention to initiate the topping function.

In two preferred embodiments of the invention as described in greater detail below, at least one grapple arm is employed to urge the tree into engagement with the drive means. The topping mechanism comprises two assemblies arranged respectively on a frame supporting the drive mechanism and a grapple arm. One of the assemblies includes a pivotable blade which may be moved between a position out of a feed path for the tree and into a position extending across the feed path to remove a top portion of the tree. An actuator mechanism controls movement of the blade and initiates the topping operation as the grapple arm approaches within a pre-selected distance from the frame. In a tree harvester of the type described in connection with the two preferred embodiments of the present invention, the drive means comprises an endless chain arrangement occupying a substantial length along the feed path for the tree. Accordingly, in both of the embodiments described below, the topping blade is arranged on the grapple arm. However, it will be apparent that for other tree harvester designs, portions of the present topping mechanism may be reversed with the topping blade being mounted upon the frame.

Tree harvesters of the type contemplated by the present invention are employed to harvest or process trees for a variety of applications, one of which is the production of pulp. It is particularly important in such applications that a high rate of productive efficiency be maintained. The present invention contributes to such efficiency by automatically accomplishing the topping operation through the use of relatively simple apparatus without requiring the operator's attention to be diverted from manipulation of the vehicle and other portions of the harvester.

Accordingly, it is an object of the present invention to provide a topping mechanism for a tree harvester which functions automatically or semi-automatically to remove a top portion of trees being processed by the harvester.

It is a further object of the invention to provide such a topping mechanism including relatively simple apparatus which functions in response to relative spacing between a frame supporting a drive means and a grapple arm for urging trees against the drive means.

Other objects and advantages of the present invention are made apparent in the following description having reference to the accompanying drawings.

IN THE DRAWINGS

FIG. 1 is a side elevation view of a vehicular tree harvester of a type with which the topping mechanism of the present invention may be employed;

FIG. 2 is a fragmentary front elevation view of the tree harvester with its components being positioned to receive a tree for processing;

FIG. 3 is a plan view of the harvester of FIG. 2 with components of the harvester being illustrated in engagement with a tree to be processed;

FIG. 4 is an enlarged fragmentary view of one grapple arm and the present topping mechanism taken from FIG. 3;

FIG. 5 is a view taken along section lines V—V in FIG. 4;

FIG. 6 is a top view of the harvester showing its grapple arm in an open position;

FIGS. 7 and 8 are side elevation views of a tree harvester including another embodiment of the present topping mechanism, the grapple arms being shown respectively in open and closed positions by these figures; and FIG. 9 is a view of the tree harvester taken along section lines IX—IX of FIG. 8 with the grapple arms in a closed position. to urge A tree harvester of the type with which the present topping mechanism may be employed is best seen is FIGS. 1–3. As illustrated in those drawings, a tree harvester assembly 11 has a movable frame 12 which is pivotably secured to the lift arms, one of which is indicated at 13, and tilt linkage 14 of a loader vehicle 16. Processing implements arranged upon the frame 12 include a delimber 17 and a shear assembly 18. A drive mechanism 19 is arranged upon the frame 12 in operating alignment between the shear assembly 18 and the delimber 17. Clamping arms or grapples 20 and 21 are also pivotably supported upon the frame 12 and may be moved toward the frame by means of hydraulic jacks 24 urge a tree into engagement with the drive mechanism 19 while maintaining the tree in proper alignment with the processing implements on the frame, particularly the delimber 17.

As may be best seen in FIG. 2 for example, the delimber includes a plurality of blades 22 which are interconnected or linked together and may be placed in close contact with the circumference of a tree, indicated at 23 in FIG. 3, by means of hydraulic jacks.

Having particular reference to FIGS. 2 and 3, the drive mechanism 19 includes a pair of chains 26 entrained about idlers 27 and drive sprockets 28. A plurality of flights 29 are interconnected in spaced apart relation between the chains, each flight including a sharpened blade 31 for penetrating the tree and maintaining driving engagement between the drive mechanism and the tree.

In operation, the tree harvesting machine is positioned as shown is FIGS. 1 and 2 to receive a standing tree in proper alignment with the delimber 17, the shear assembly 18 and the drive mechanism 19. The grapples 21 are then moved from their open positions as illustrated in FIG. 1 to a closed position (See FIG. 3 for example) to maintain alignment of the tree within the harvester while it is being severed by the shear assembly 18. The tree is then rotated into a generally horizontal position along with the frame 12 by means of the tilt linkage 14. With the delimber being positioned in close engagement with the circumference of the tree, the drive mechanism 19 is then set in rotation to propel the tree through the delimbing mechanism for removing limbs or other protrusions from the tree.

A substantial portion of the present topping mechanism is mounted upon one of the grapple arms as indicated at 41 in FIGS. 1–3. The first embodiment of the topping mechanism as indicated in FIGS. 1–3 is described in greater detail below with particular reference to FIGS. 4–6. The topping mechanism includes a cutter blade 42 pivotably mounted upon the grapple arm 21 and an actuator which is generally indicated at 43, the actuator being best seen in FIG. 5. A stop plate 44 secured to the frame 12 provides for automatic operation of the actuator 43 to initiate topping of a tree as the grapple arm approaches within a preselcted distance from the frame corresponding to a preselected tree diameter, for example, of approximately three inches.

The blade 42 has a sharpened edge 46 which extends into or against the direction of travel for the tree along its feed path as may be best seen for example in FIGS. 1, 3 and 5, at least while the blade 42 is pivotably approaching the feed path for the tree. The blade 42 is rigidly secured to a shaft 47 which is rotatably supported in parallel relation upon the arm 21 by brackets 48 and 49. Referring again to FIG. 5, cylindrical plunger 51 is slidably arranged in a bore 52 of a housing 53 mounted on the grapple arm 21 with the plunger 51 extending in perpendicular relation to the shaft 47. The plunger 51 is acted upon by a spring 54. The outwardly projecting or rightward end 56 of the plunger, as viewed in FIG. 5, engages with a cammed surface 57 on an arm 58. The arm 58 is secured in splined relation to the shaft 47 by bolts 59 and extends downwardly for engagement with the plunger.

In operation, the plunger 51 is normally urged rightwardly (as viewed in FIG. 5) by the spring 54 to act upon the arm 58 and maintain the cutter blade in a generally erect position away from the feed path for a tree (See FIG. 3). The cutter blade of the topping mechanism remains in that position while a substantial portion of the tree is being delimbed. However, since the grapple arms are constantly urged toward the frame by the motors 24, the arm 58 engages the stop surface 44 when the diameter of the tree between the drive mechanism and the grapple arms is reduced to a preselected diameter, for example, 3 inches. As a roller 60 on the arm 58 encounters the stop plate 44, the shaft 47 and the cutter blade 42 are rotated in a clockwise direction as viewed in FIG. 5 for example. The blade is thus pivoted towards a position indicated at 42' where it extends across the feed path for the tree. As the blade is being pivoted away from its erect position 42 and engages the tree, motion of the tree tends to force the blade into its position 42' so that the top of the tree is automatically severed.

The cutting blade is initially urged toward the tree when the tree diameter is approximately 3 inches and the tree tends to be severed at a point where it has a diameter of approximately 2½ inches for example. A bracket 61 limits movement of the blade towards the drive mechanism to prevent engagement of the blade with the blades 31. For example, as the blade is pivoted towards its actuated position 42', a flat surface 62 on the bracket contacts one of the drive chains 26 and thus prevents further movement of the topping blade toward the drive mechanism.

After the topping operation is complete, the grapple arms are retracted away from the frame by the motors 24. The arm 58 is then again positioned by the spring 54 and the blade 42 and the the blade of the topping attachment is returned to its position indicated at 42 when a surface 63 of the bracket 61 engages a top surface 64 of the arm 21.

The tree diameter to be severed by the topping mechanism can be varied, for example by the use of spacer plates such as that indicated at 66 between the stop plate 44 and the frame 12. The spacer plate 66 could be removed to decrease the diameter of the tree when it is topped or the tree diameter could be increased by the use of additional spacer plates.

The present topping mechanism also includes means for varying tension on the spring 54 to proportionally vary the amount of force required to depress the plunger 51. For this purpose, a seating plate 67 against which the spring 54 acts, and a spacer cylinder 68 are secured to the housing 53 by bolts 69. The positions of the spacer cylinders 68 and the seating plate 67 may be reversed to increase tension upon the spring 54.

Another embodiment of the present topping mechanism is illustrated in FIGS. 7–9 for association with a tree harvester similar to that described above. Accordingly, various components of the harvester illustrated in FIGS. 7–9 are indicated by primed numerals similar to those employed in FIGS. 1–6. In this embodiment, a cutting blade or topping blade 111 having a sharpened edge 112 is supported by brackets 113 which are connected to one of the grapple arms 121' by pivotable connection 114. A pair of springs 116 are connected between a topping blade 111 and the grapple arm 121' with a tendency to urge the blade toward the drive mechanism and thus into its actuated position.

In this embodiment, actuator means for controlling the blade position comprises a rod 117 rigidly secured to one of the brackets 113 and extending towards the frame 12' when the grapples are in their open position as illustrated in FIG. 7. Thus, as the grapple arms are completely opened, a plate 118 secured to the extended end of the rod 117 engages a stop 119 so that the blade 111 and brackets 113 are urged in a clockwise direction as viewed in FIG. 8. The blade is urged in that direction until the springs 116 are over-center with respect to the pivotal connections 114 so that the blade tends to remain in a cocked position completely out of the feed path for a tree passing through the harvester even when the grapple arms are again closed.

As the diameter of the tree decreases for example to 3 inches, the grapple arms move closer to the drive mechanism and the plate 118 engages another stop 121. Engagement of the plate 118 with the stop 121 rotates the blade and support brackets in a counterclockwise direction as viewed in FIG. 8 so that the springs 116 again become effective to urge the blade into engagement with a tree and severing of the tree is accomplished primarily by moving force of the tree itself as with the embodiment of FIGS. 1–6. The support brackets 113 also have stop surfaces 122 which engage a surface of the grapple arm 21' to prevent the topping blade 11 from engaging with the blades 31' of the drive mechanism (See FIG. 9).

We claim:

1. A topping mechanism for a tree harvester of the type including a vehicle, a frame movably mounted on the vehicle, a delimber arranged on the frame, drive means arranged on the frame to propel a tree along a feed path and through the delimber and at least one grapple arms mounted on the frame for movement toward and away from a portion of the frame to urge the tree into engagement with the drive means, the topping mechanism comprising a topping blade supported on the grapple arm for pivotal movement between a first position out of the feed path and a second position intersecting the feed path, the blade including a cutting edge arranged for severing engagement with the tree as the blade pivotably approaches the tree and means for controlling the blade position including stop means arranged on the frame and actuating means coupled with the blade and arranged for engagement with the stop means on the frame.

2. The topping mechanism of claim 1 wherein the means for controlling the blade position includes spring means effectively coupled with the blade and tending to urge the blade into one of its first and second positions.

3. The topping mechanism of claim 1 wherein the topping blade is secured to a shaft rotatably mounted upon the grapple arm, a lever arm being secured for rotation with the shaft, a spring-loaded plunger being mounted for longitudinal motion within a portion of the grapple arm and acting upon the lever arm with a tendency to urge the topping blade into its second position, a stop surface being arranged upon the frame for abutting engagement with the lever arm as the grapple arm approaches the frame.

4. The topping mechanism of claim 1 wherein the topping blade is pivotably mounted upon the grapple arm, spring means being interconnected with the topping blade and tending to urge it into its first position, the spring means entering into an over-center condition with respect to the pivotal connection between the topping blade and the grapple arm when the topping blade is in its second position, a first stop being arranged upon the frame and tending to urge the blade from its first position toward its second position as the grapple arm approaches the frame, a second stop being arranged upon the frame and tending to urge the blade from its second position into its first position as the grapple arms are retracted into an open position with respect to the frame.

5. A topping mechanism for a tree harvester of the type including a vehicle, a frame movably mounted on the vehicle, a delimber arranged on the frame, drive means arranged on the frame to propel a tree along a feed path and through the delimber and at least one grapple arms mounted on the frame for movement toward and away from a portion of the frame to urge the tree into engagement with the drive means, the topping mechanism comprising two assemblies arranged respectively on the frame and the grapple arm, one of the assemblies including a pivotable topping blade arranged for movement between a first position out of the feed path and a second position wherein the blade is extended across the feed path, the blade including a cutting edge arranged for severing engagement with the tree along the feed path as the blade pivotably approaches the tree and actuating means for controlling movement of the blade between its first and second positions, the other assembly including stop means arranged for engagement with the actuating means as the grapple arm approaches within a preselected distance from the frame.

* * * * *